US005761380A

United States Patent [19]

Lewis et al.

[11] Patent Number: 5,761,380
[45] Date of Patent: Jun. 2, 1998

[54] COORDINATING INSTALLATION OF DISTRIBUTED SOFTWARE COMPONENTS

[75] Inventors: Paul David Lewis, Austin; Robert Earl Morrison, Round Rock; Neil Raymond Pennell, Austin; Richard Walton Ragan, Jr.; James H. Segapeli, both of Round Rock, all of Tex.

[73] Assignee: International Business Machines Corporation, Armonk, N.Y.

[21] Appl. No.: 600,083

[22] Filed: Feb. 12, 1996

[51] Int. Cl.[6] .................................................. G06F 17/20
[52] U.S. Cl. ............................ 395/12; 395/10; 395/50
[58] Field of Search ............................. 395/10–12, 30, 395/600, 650, 200, 700, 50, 60–61; 370/17, 13

[56] References Cited

U.S. PATENT DOCUMENTS 4,864,492  9/1989  Blakely-Fogel et al.
5,175,800  12/1992  Galis et al.
5,289,460  2/1994  Drake, Jr. et al. ......................... 370/17
5,421,009  5/1995  Platt .......................................... 395/600
5,436,909  7/1995  Dev et al.
5,555,416  9/1996  Owens et al. ............................. 395/700

*Primary Examiner*—Tariq R. Hafiz
*Attorney, Agent, or Firm*—Jeffrey S. LaBaw

[57] ABSTRACT

A method for installing a network application is disclosed. First, the hardware resources of at least a local computer system in the network are determined. Next, the a number of users in a cell of the network is determined. The installation process determines whether the hardware resources of the local computer system can provide an adequate level of performance for the number of users in the cell if all of the network application are installed on the local computer system. If not, an installation plan is calculated to distribute components of the network application in a plurality of computer systems to provide an adequate level of performance for the cell. The installation plan is presented on a local system display. The network administrator is afforded the opportunity to change the assumptions used to generate the installation plan. Once satisfied, the network application is installed in the plurality of computer systems according to the installation plan.

19 Claims, 9 Drawing Sheets

COORDINATING INSTALLATION OF DISTRIBUTED SOFTWARE COMPONENTS

BACKGROUND OF THE INVENTION

This invention relates generally to the installation of software programing on data processing systems. More particularly, it relates to an improved method to help a network administrator plan and install network software in a distributed computing environment.

In the early days of computing, computer systems were standalone processors to which peripheral devices such as displays, printers and input devices were coupled. Each computer system was independent; there was very little communication between computer systems. Today, it is well known to interconnect computer systems in complex computer networks, to share data, services and resources associated with the numerous computer systems which have access to the distributed computing environment. Quite naturally, as the computer network has expanded in size and complexity, it has become much more difficult to administer the network. One of the more onerous tasks for the network administrator is the task of installing and updating software across the network.

In a distributed computing environment, components of a distributed application interact cooperatively even while running on separate computers. In addition, these components will interact with other software products operating on the same computer. The performance of the distributed application will be dependent upon these interactions as well as the hardware resources available on individual machines in the distributed computing environment. Further, the total processing load for the individual computer acting as a service provider as well as the total processing load for the network as a whole will help determine performance. Tradeoffs can be made between performance and the resources on the network; the greater the number of computers in the network dedicated to a particular task and the larger and more capable the random access memory, DASD, and processors on those individual computers the faster the performance will be. Of course, dedicating hardware comes at a certain cost.

In the prior art, the network administrator was required to perform detailed calculations or conduct empirical trials to determine the proper distribution of distributed application on the appropriate hardware in the distributed computing environment. Further, as many software programs require other software programs to be installed on a given computer, a network administrator was also required to plan a sequence of installation for each machine for the distributed software programs. Typically, if the calculations were incorrect or trials were unsuccessful, the administrator might need to uninstall software on various computer systems, reconfigure the network or install more of random access memory and DASD on particular machines and start the process again.

Thus, the need is apparent for mechanism to relieve the network administrator from performing lengthy and detailed analysis for a successful installation and distribution of software components in a network.

SUMMARY OF THE INVENTION

Therefore it is an object of the invention to plan and install a network application across a plurality of computer systems in the computer network.

It is another object of the invention to determine an expected performance of the network application given a set of hardware and software assumptions.

It is another object of the invention to allow the administrator to modify an installation plan to account for the available resources in the computer network.

These and other objects of the invention are accomplished by a method for installing a network application. First, the hardware resources of at least a local computer system in the network are determined, either through a sensing process or by user input. Next, the a number of users in a cell of the network is determined, either by user input or by consulting data already stored in the network. The installation process determines whether the hardware resources of the local computer system can provide an adequate level of performance for the number of users in the cell if all of the network application are installed on the local computer system.

If not, an installation plan is calculated to distribute components of the network application in a plurality of computer systems to provide an adequate level of performance for the cell. The installation plan is presented on a local system display. The network administrator is afforded the opportunity to change the assumptions used to generate the installation plan. Once satisfied, the network application is installed in the plurality of computer systems according to the installation plan.

In one preferred embodiment, the installation of components of the network application can be remotely from the local machine via an electronic installation process. An expert system is used to calculate the level of performance and the installation plan.

BRIEF DESCRIPTION OF THE DRAWINGS

These objects, features and advantages will be more readily understood with reference to the attached figures and following description.

DETAILED DESCRIPTION OF THE PREFERRED EMBODIMENT

The invention may be run on a variety of computers or collection of computers under a number of different operating systems. The a computer is running in a distributed network of other computers. Although the specific choice of computer is limited only by processor, RAM and disk storage requirements, computers in the IBM PC series of computers could be used in the present invention. For additional information on IBM's PC series of computers, the reader is referred to *IBM Pc 300/700 Series Hardware Maintenance Pub No. S83G-7789-03 and Manual User's Handbook IBM PC Series 300 and 700* One operating system which an IBM PS/2 personal computer may run is IBM's OS/2 2.0 (TM) for more information on the IBM OS/2 2.0 Operating System the reader is referred to *OS/2 2.0 Technical Library, Programming Guide Vol.* 1, 2, 3 *Version 2.00* Order Nos. 10G6261, 10G6495, 10G6494.

In the alternative, the computer system might be in the IBM RISC System/6000 (TM) line of computers which run on the AIX (TM) operating system. The various models of the RISC System/6000 is described in many publications of the IBM Corporation for example, *RISC System/6000, 7073 and 7016 POWERstation and POWERserver Hardware Technical* reference, Order No. SA23-2644-00. The AIX operating system is described in *General Concepts and Procedure—AIX Version 3 for RISC System/6000* Order No. SC23-2202-00 as well as other publications of the IBM Corporation.

Figure 1:
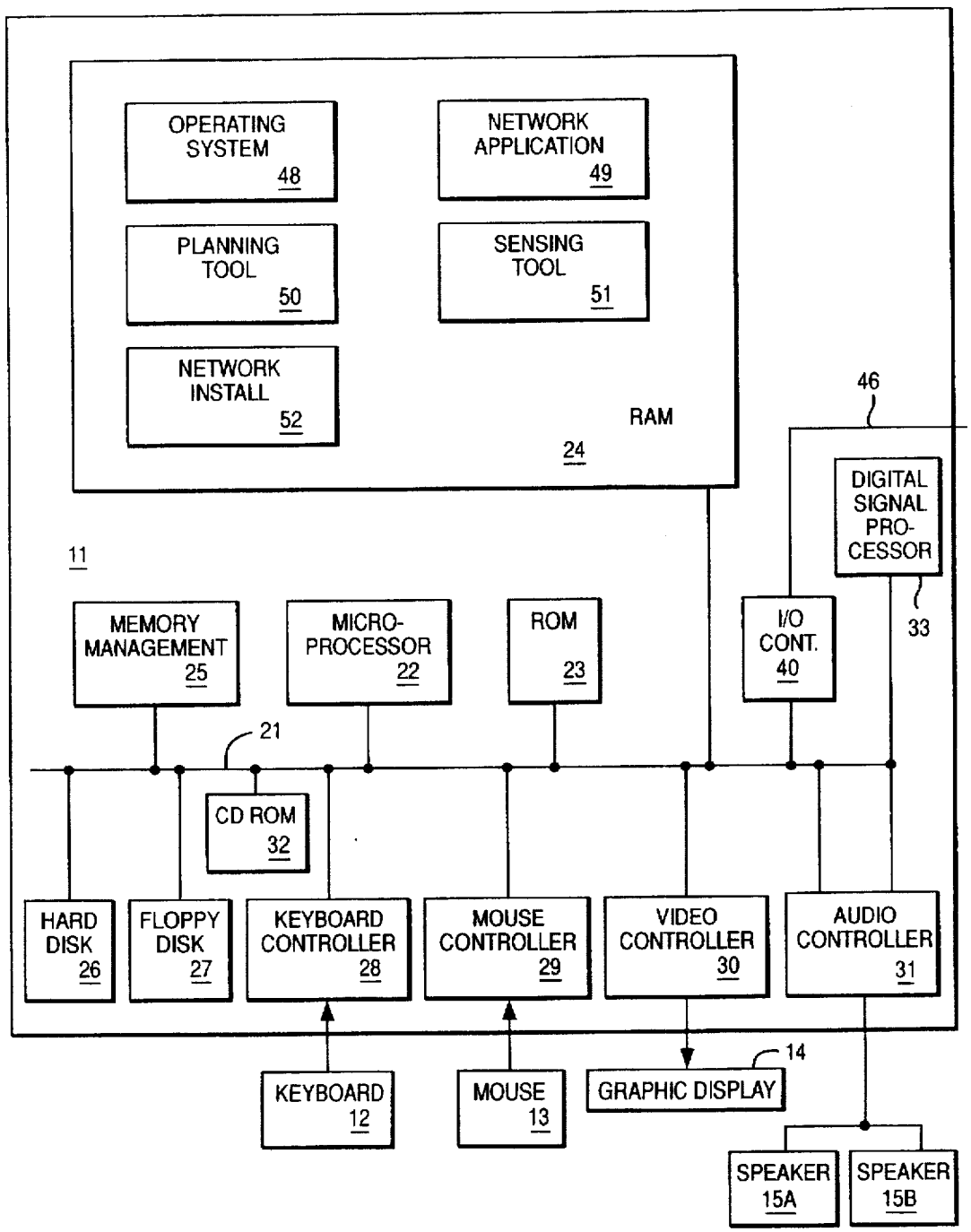
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 386, or Pentium™486 microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or others Hewlett Packard, Sun, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. One skilled in the art would appreciate that the physical storage of the sets of instructions physically changes the medium upon which it is stored electrically, magnetically, or chemically so that the medium carries computer readable information.

While it is convenient to describe the invention in terms of instructions, symbols, characters, or the like, the reader should remember that all of these and similar terms should be associated with the appropriate physical elements. Further, the invention is often described in terms of installing or recommending, or other terms that could be associated with a human operator. Except where an action is expressly described as being taken by the network administrator, the operations are machine operations processing electrical signals to generate other electrical signals. No action by a human operator is desirable in any of the operations described herein which form part of the present invention.

Figure 2:
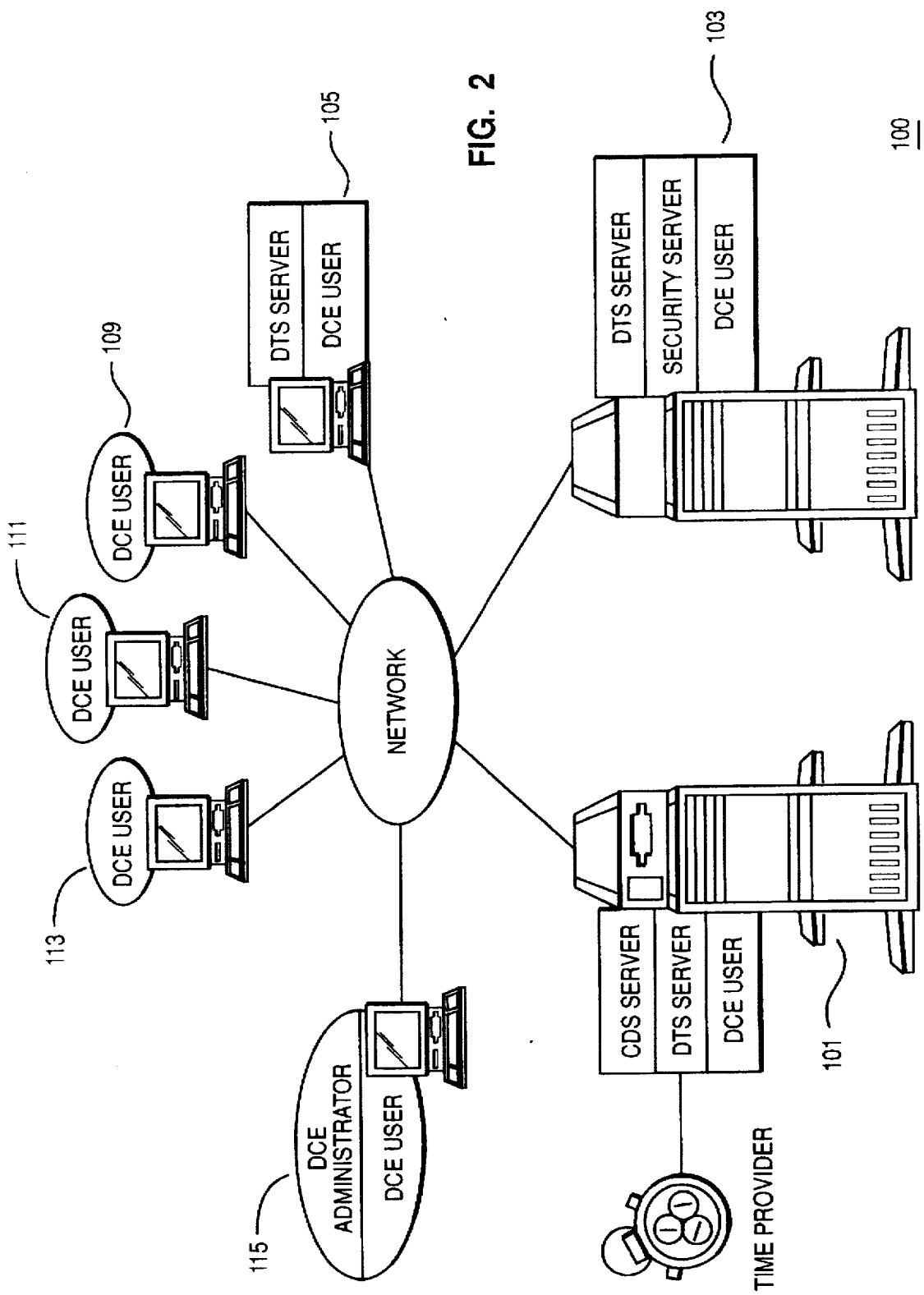
FIG. 2 is a diagram of a distributed computing environment including a plurality of server machines and client machines.

A representative distributed computing environment 100 is shown in FIG. 2. The present invention seeks to relieve the network administrator of many of planning and installation burdens heretofore associated with a complicated installation of a distributed application. As shown in the figure, a plurality of server machines 101, 103, 105 and client machines 109, 111, 113, 115 are usually present in today's network environments. The server machines may be special purpose, that is dedicated to primarily to a single task with a single server application resident, or may have a plurality of lighter-weight server applications resident. The server machines may also duplicate the functions in part or in whole of another server machine for purposes of redundancy and fault tolerance. Each of the client machines is usually dedicated to a single human operator and may make requests of any of the servers in the network environment. Further, the designation of "server" and "client" may vary according to task as the machine designated as a server for one task, i.e. provides services to client machines, may in turn request other services, i.e. act as a client, from the same machines for which it acted as a server.

Those skilled in the art would readily understand that the illustration in FIG. 2 is an over-simplification of a network as many more machines might exist in a variety of different roles. Furthermore, as a local area network can be coupled to another local area network, either by a router or a gateway or by telecommunications connections thereby creating a wide area network, the reader will appreciate that the environment could become quite complex indeed.

The embodiment of the present invention described below, is a very relatively simple application of the present invention. The invention is useful for the Directory and Security Server (DSS) product manufactured by the IBM Corporation. This product contains a plurality of components which provide the technology from the Open Software Foundation's (OSF) Distributed Computing Environment (DCE). In particular, the DSS product provides directory, security, time, remote procedure call (RPC) and threads services each with a separate server. The DSS product also includes a file and print server technology. The file and print server includes a domain controller which allows the network administrator to segregate sets of users and machines into particular domains and levels of privilege. While the time, RPC and thread services can be installed in separate machines, as they are relatively light weight, they can also be installed together with the directory or security server. Also, while the file and print server and domain controller can be installed in separate machines, they also can usually be integrated in the same machine. Thus, for the purposes of the illustrative embodiment, the administrator is concerned with whether the installation of the directory server, the security server and the domain controller can be accomplished on one or more server machines. Those skilled in the art will appreciate that fine tuning of the network through separate installation of the time, RPC and threads servers as well as underlying operating system, communication software and various clients could be accomplished through the use of the invention.

When components of a software product can be distributed across multiple systems, they may need to follow self-imposed rules for splitting/combining and for the order of installation and "bootstrapping" of the components.

With DSS, security, directory, and domain controller components can all be separately installed. Domain controller is brought up after security and directory are initialized, thus, they are installed first. The security and directory components are inter-dependent. Neither can come up to a functional level without the presence of the other, as the security server is an object in the global directory maintained by the directory server, and the directory server needs the authorization of a security server to begin providing directory services to other computers. A bootstrapping process occurs as follows: The security server is installed first and initializes partially to the point where a directory server is required. The directory server is then installed, and during initialization makes contact with the security server, getting required information to allow it to successfully initialize. The security server may then be prompted to continue its initialization and also reach a fully functional state. Following this, the domain controller is installed and initialized.

Figure 3:
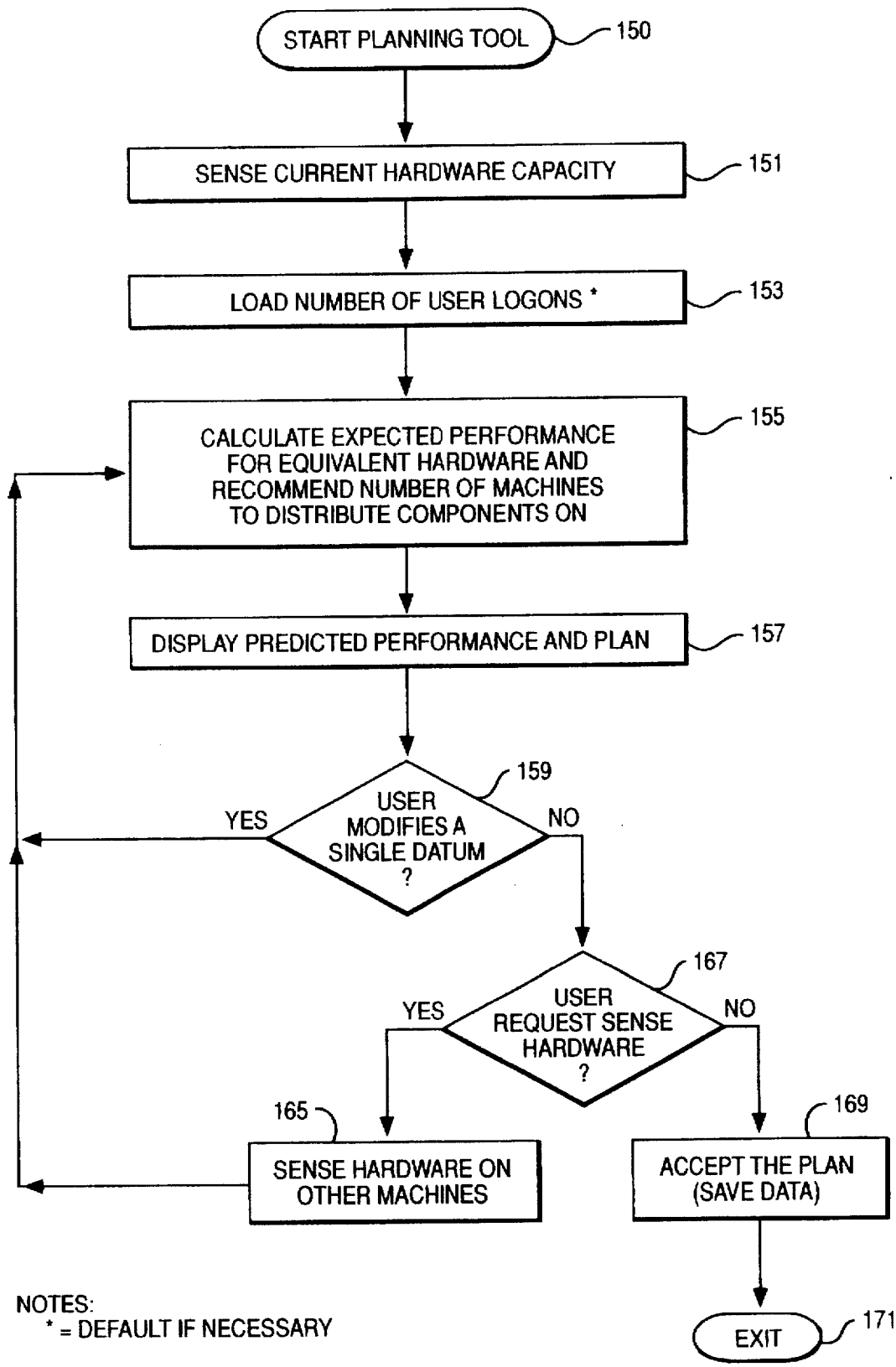
FIG. 3 is an illustration of a planning process according to the present invention.

A flow diagram of the planning process is depicted in FIG. 3. In step 150, the administrator has started the planning tool. Each version of the planning tool is envisioned to come as part of the software and is configured to provide recommendation for the particular piece of software. In general, the software is a distributed application with a plurality of components which may be installed on one or more machines in the network. Alternatively, the planning tool could cone as a standalone application which has knowledge of preferred configurations for a particular set of applications. In addition, if desired the planning tool may also sense the software components on the administrator's machine both to determine whether the prerequisite software is already resident and to provide input to the performance calculations described below. A graphical user interface appears on the administrator's display. The planning tool senses the hardware capacity, e.g., amount of RAM, amount of storage available and total storage on hard file, processor, and processor speed, of the administrator's machine. Sensing the hardware components at a local machine is known to the art. Although there are many ways to determine this hardware information, much of it is available through the operating system. In the OS/2 operating system for example, the CPU type is determined by querying the OS/2 resource manager. The CPU speed is determined by executing an algorithm that measures how quickly some function is performed. The amount of RAM is determined using an OS/2 API call to query the BIOS, which finds the working RAM at boot time The amount of unused system hard-disk storage (DASD) is determined by executing DOS API call "DosQueryFSInfo" to each available drive or partition to query the amount or free storage space. This could be done by searching for a particular file in memory.

Next, in step 153, the number of users, i.e. client machines, in the network or cell of the network is entered into the planning tool. The number of user logons could be determined by the planning tool by referring to a data already existing in the network at a server. For example, a query could be made to an existing file server as to the number of clients which it serves. However, this approach assumes that the current number of client machines at the existing server is identical to that planned by the administrator. This may not be a good assumption. Thus, it is a better choice to allow the network administrator to input the number of users which are planned for the cell. Whichever approach is chosen, as is described below, upon presentation of the expected performance, the network administrator may choose to modify the number of clients supported.

In step 155, the expected performance for equivalent hardware to the network administrator's machine is calculated. A recommendation for the number of machines to distribute components of the software is also calculated. This calculation could be performed by some sort of weighted algorithm, wherein a number of client machines, and the hardware capacity, random access memory and processor speed and type of the server machines as well as software such as operating system and communication software are all variables in the algorithm. However, in the preferred embodiment, an expert system which uses a set of inference tables and rules to recommend the distribution of components is preferred. While simple installations could possibly use some sort of algorithmic solutions, it is expected as the complexity of the software and network increase, the rule based expert system solution would provide more accurate recommendations. A software vendor can perform extensive tests to determine the relative performance of the software modules as they are distributed on different types of machines in a test lab. This actual experience is used to populate the inference table of the expert system to make the recommendations to the network administrator.

In step 157, the predicted performance and recommended number of machines for the installation of various products are presented to the user. For example, the planning tool may indicate that performance would be "not acceptable", "acceptable" or "marginal" for the values given to the planning tool. For example, the planning tool might indicate that performance of the cell would be "acceptable" if the directory server, security server and domain controller were installed on three separate machines with a similar hardware capacity as that of the network administrator. Instead of a verbal description of "acceptable" numbers for particular levels of performance could be given by the planning tool, however, the applicants believe that the changes in relative performance are more important and meaningful to the administrator. However, the network administrator may not like the proposal made by the planning tool. The network administrator may not be planning to allocate three machines for the DSS product. The network administrator may not have three machines of the same performance level of the machine being currently used and so forth. Therefore, in step 159, the network administrator may modify the data in the plan. For example, the administrator may want to see the effect of changing the installation from three machines to two machines or changing the processor speed of the server machines to more accurately reflect the actual machines in the network. The tool returns to step 155 where the expected to performance is calculated for the modified plan and displayed in step 157. The process is iterative until the user is satisfied with the plan.

In step 165, the network administrator may request that the other machines are manually adjusted. (Do not understand this step) In step 167, the network administrator knowing that the local machine is not representative of the other machines in the network, but not remembering exactly the remote machine capabilities, requests that the planning tool sense the capabilities on other machines. In step 169, the remote hardware is sensed, i.e. RAM, DASD, processor. At this point the software resident on the other machines may be sensed as part of the performance calculation. This step presumes that some network communication functions are already operable in the environment. The existing network functions may be used to contact remote machines perform the same hardware sensing that occurs on the local machine through interaction with the remote machine's operating system. Software could be sensed as well through the network communication functions. If network communications did not already exist, an error would be returned at this point. The process returns to step 155 to calculate the expected performance based on the sensed hardware characteristics of remote machines. In one preferred embodiment, the administrator can select particular machines in the network to sense as it is unlikely that all the machines in the network are potential server machine candidates. Further, if the administrator has selected more candidate machines than necessary for installation, a dialog box would be presented to the administrator to select the machines to be used by the planning tool calculations.

In one preferred embodiment, particular recommendations may be made as to which machine should be used for a particular which component. For example, as the directory server may require the highest processing speed and greatest amount of storage, the planing tool may recommend the most capable machine be used for the directory server.

After the network administrator is satisfied with the expected performance and distribution of software, in step 169, the plan is accepted and saved. The process exits in step 171.

Figure 4:
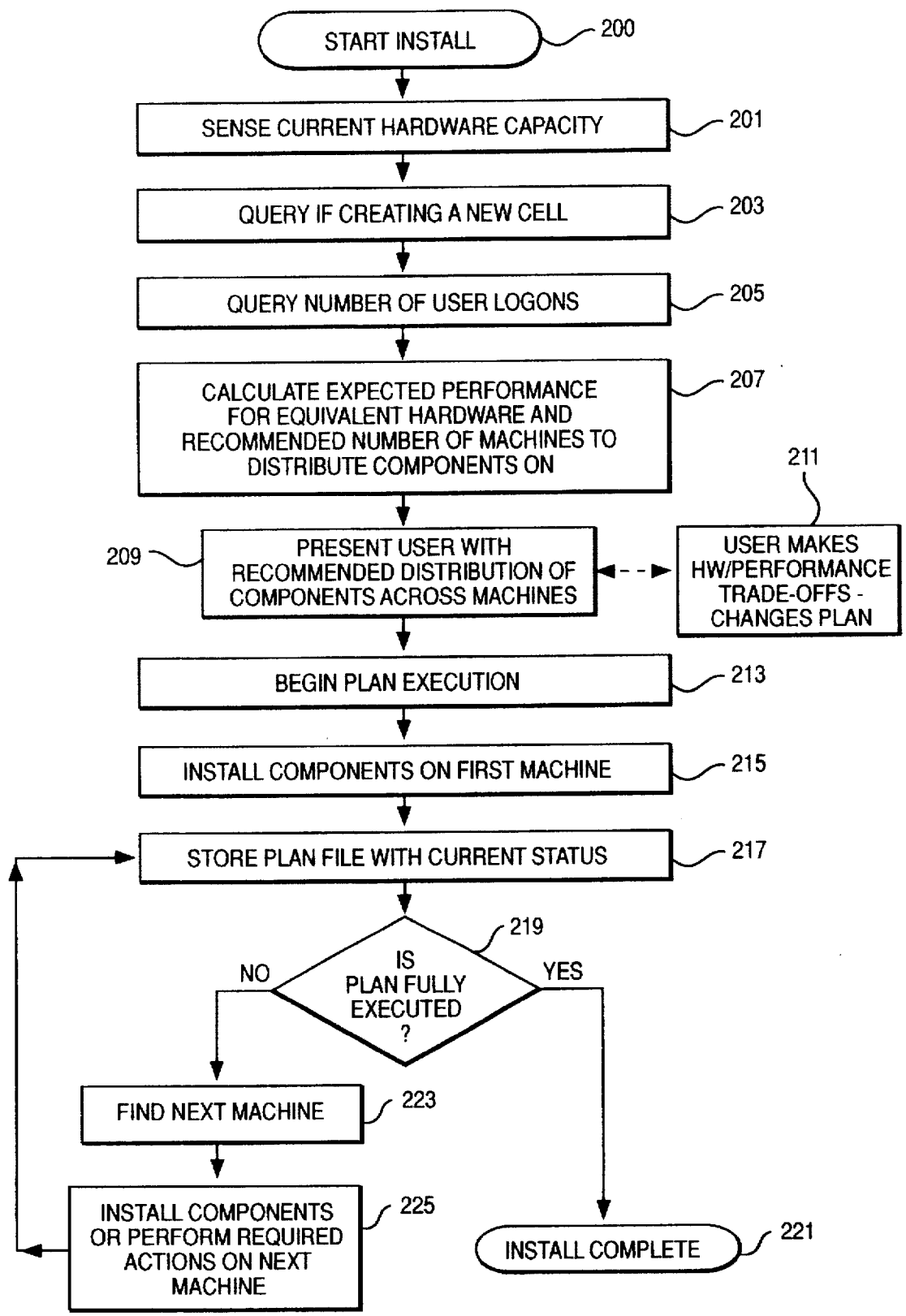
FIG. 4 is a flow diagram of installation process according to the present invention.

The planning tool could be used as part of an installation process for network software. Such a process is depicted in FIG. 4. The install process begins in step 200. In step 201, the hardware characteristics at the local machine are determined. A panel in a graphical user interface is presented to a administrator in step 203. The panel queries the administrator whether a new cell in a network is being created. If so, a second panel is presented asking the administrator to input the number of users in the new cell. In an alternative embodiment, if the installation is occurring in an existing cell (not pictured), the installation process could determine the characteristics of the existing cell through a series of panels or by sensing other machines in the local cell. These characteristics would be used by the installation program to install the components of the software correctly. In the embodiment illustrated in the figure, it is assumed that a new cell is being created.

In step 207, the expected performance for hardware similar to the local machine and a recommendation of a number of machines to distribute the components of the distributed application are calculated. These are presented to the user in step 209 which may begin an iterative process as described above and summarized as step 211, wherein the administrator uses the planning tool to evaluate various hardware and performance trade-offs to arrive at an installation plan which is acceptable.

In step 213, the installation tool begins the execution of the accepted install plan. In the illustrative embodiment, the installation of the directory server, the security server and the domain controller can take place on one, two or three machines. The present invention may be used in a traditional installation where a network administrator will use an installation diskette generated by the install process together with a CD-ROM on which the directory server, the security server and the domain controller are stored to physically install the components machine by machine. It also may be used in an Electronics Software Distribution (ESD) process where a code server is used to install the software over the network. In the illustrative embodiment, where only one, two or three machines are accessed during the installation process, physical installation is feasible. Where the number of machines escalates, e.g., installing clients, ESD is clearly preferred. There are any number of installation procedures and ESD procedures already existent. For example, the IBM Configuration Installation and Distribution process is a known means of installing software to remote machines over a network. Normally, during either the physical installation or the ESD installation an installation diskette is built. The installation process would be told by the plan how many machines were to be used. It would be how to distribute the components across that number of machines, and would know the correct order for installing and initializing the software on each machine. The install process would write to diskette the components to be installed on each machine and the order of machines.

In step 215, the installation diskette together with a CD-ROM is used to install the components on the first machine. Upon the successful completion of the installation process on the first machine, the status of the installation plan is stored in the installation diskette in step 217. If the installation plan called for all three components to be installed on the single machine, the plan would be fully executed; if, however, the plan called for the installation of the components across several machines, it would be so noted in the plan file. Next, in step 219, a test is made to determine whether the plan is fully executed, if so, the process ends in step 221. If not, in step 223, the next machine is found either electronically through the network or physically by the network administrator. In step 225, the components slated for installation on the next machine are installed. The process continues until the install plan is fully executed.

One of the more useful features of the present invention is a graphical user interface in which the network administrator inputs the desired characteristics of the cell and the planning tool presents the calculated performance and recommended installation. Through an iterative procedure, the network administrator can arrive at the best trade-off between available hardware resources and the desired performance.

Figure 5:
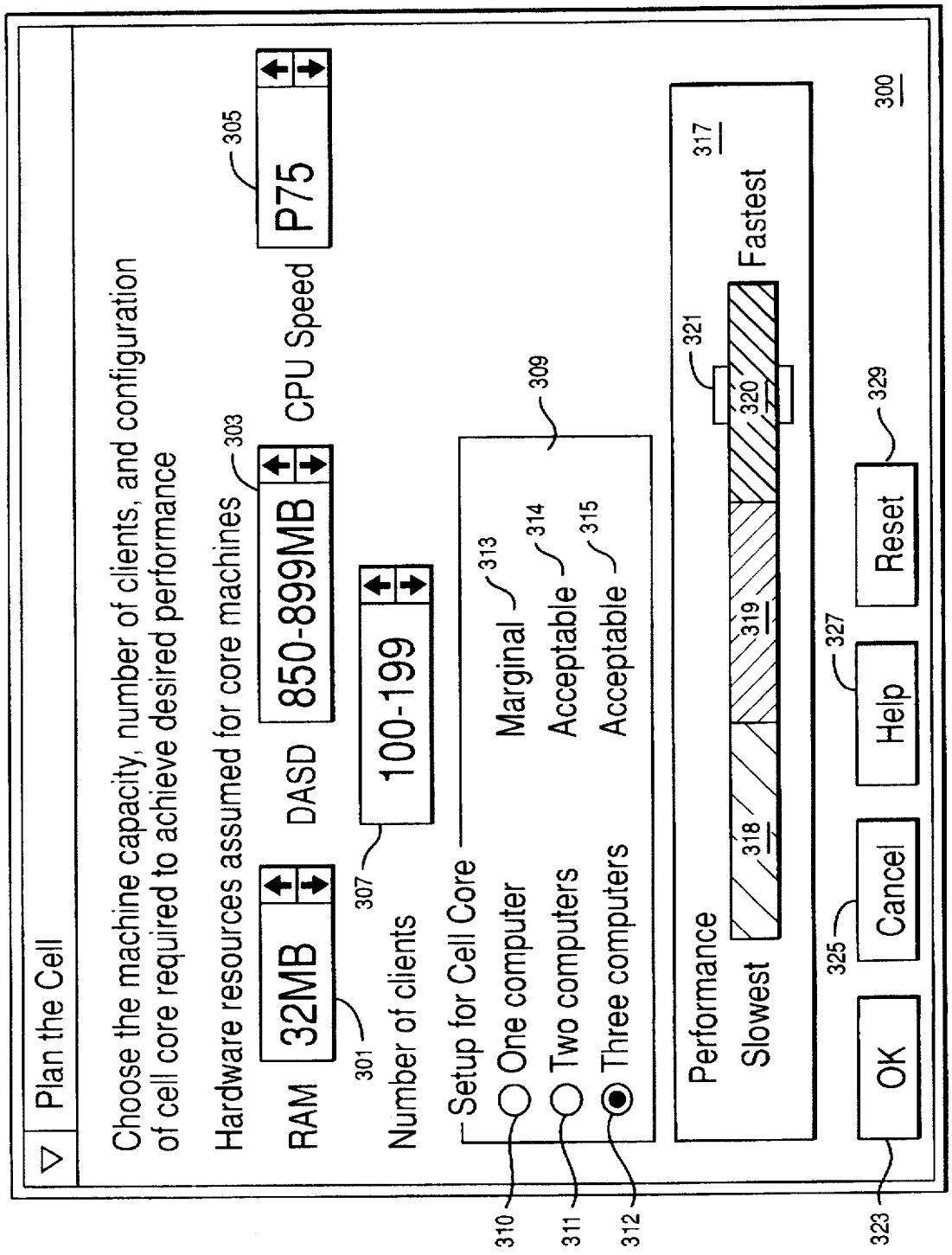
FIG. 5 is a graphical user interface to assist the user in the planning process in the distributed computing environment.
Figure 6:
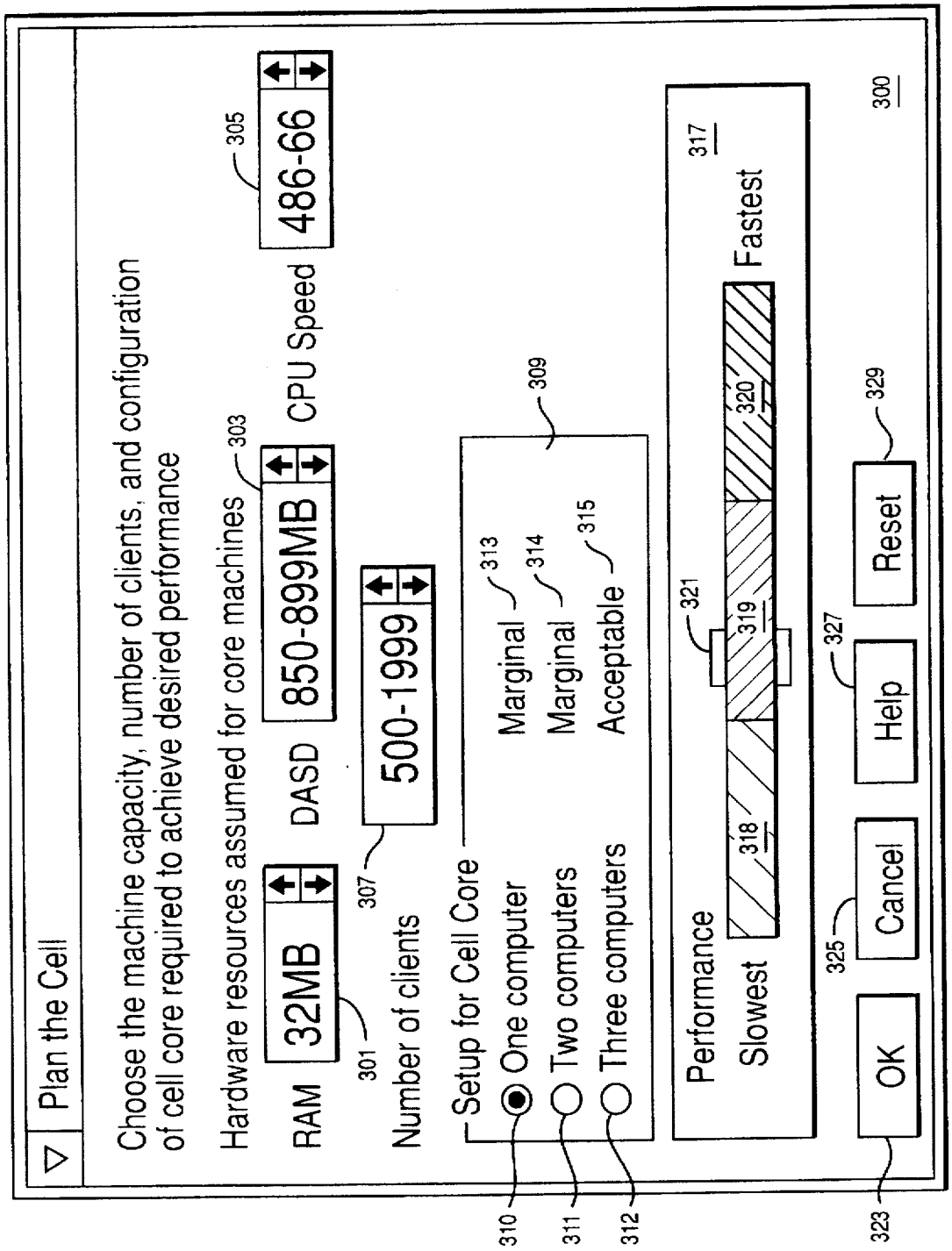
FIGS. 6 and 7 are depictions of the user interface in FIG. 5 wherein the user has changed one or more parameters.
Figure 7:
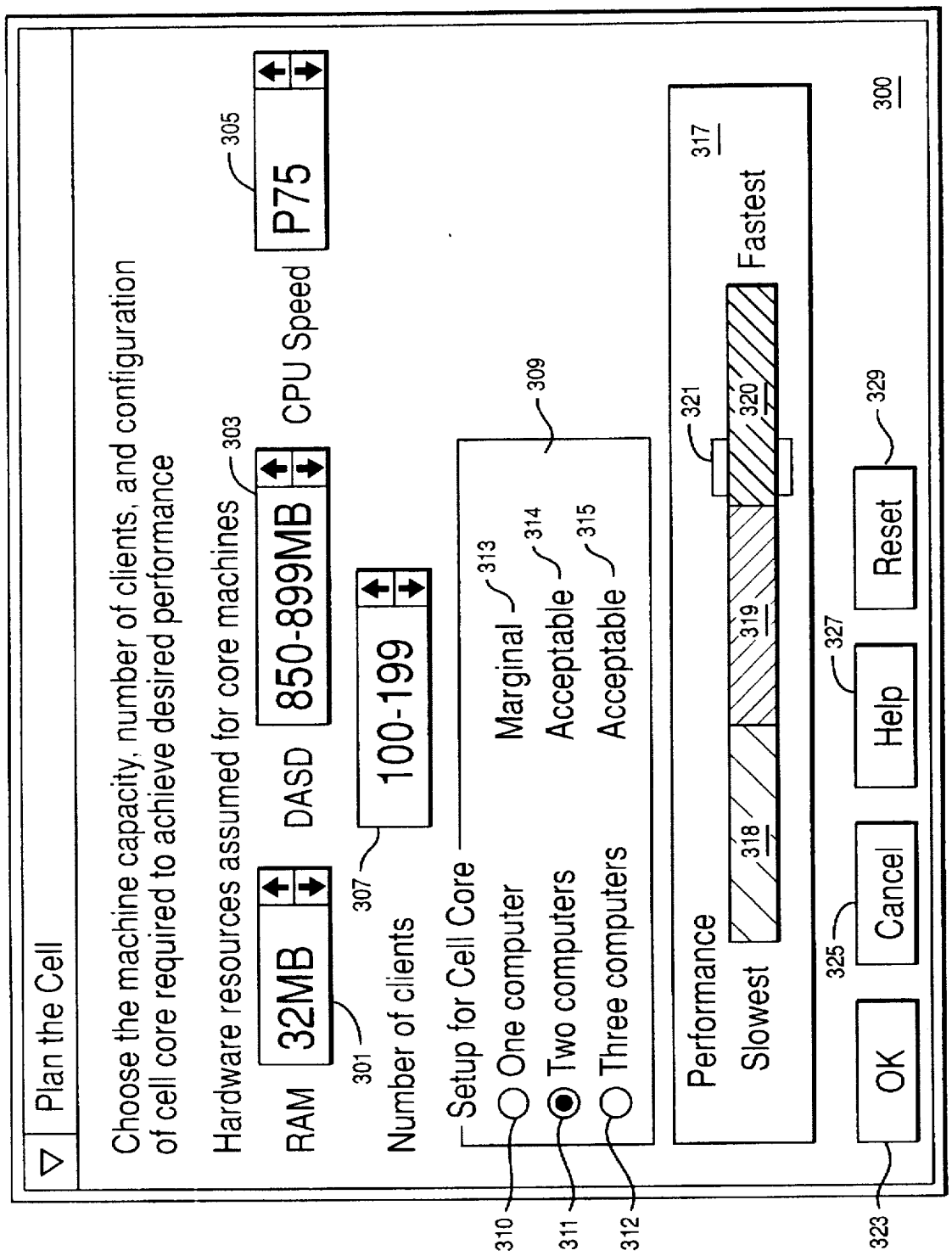

In FIGS. 5-7, the planning panel is presented. As discussed above, the first presentation of the panel which might be after the local machine was sensed and the default number of clients chosen by the planning tool. Spinbuttons 301-307, present the sensed hardware resources on the local machine and the default number of clients. More specifically, the RAM spinbutton 301, presents 32 megabytes of RAM, the DASD spinbutton presents a range of 850 to 899 megabytes of available hard disk space, the CPU speed spinbutton 305 shows a Pentium(TM) class processor running at 75 megahertz and the clients spinbutton 307 shows a default value of between 100 and 199 clients in the cell. Note the spinbuttons provide a means for both presenting the sensed hardware characteristics as well as altering the values of the characteristics by the network administrator. Altering these values is necessary where the machines actually contemplated for the installation do not resemble the local machine. As mentioned above, sensing software components is also center plated in an alternative embodiment. Separate spin buttons or other entry presentation means would be provided in the panel for the software information.

Cell core block 309 shows the recommended or selected setup for the cell core, i.e. whether one, two or three computers is recommended. In the figure, the planning tool has recommended installing the DSS product over three computers as it would give the fastest performance. Radio buttons, 310–312 allow the user to see the present setting as well as reset the recommendation of the planning tool. Data fields 313–315 show a calculated level of performance as either "not acceptable", "marginal" or "acceptable". These could be related to the administrator more precisely in numerical terms, if desired by the designer of the planning tool e.g., as a percentage of max possible performance, 100% being the top end of the scale, and tick marks alone the scale showing lesser proportions. The value associated with the switch from green to yellow, i.e. acceptable to marginal, could be determined empirically by testing the reactions of users to experienced levels of performance.

Performance bar 317 shows the expected performance of the cell for the given parameters more exactly. Performance bar 317, includes three fields, a not acceptable field 318, a marginal field 319 and an acceptable field 320. These fields might be colored red, yellow and green respectively to provide a visual cue to the network administrator. A slider 321 would indicate a calculated level of performance in the range of possible performance.

A series of pushbuttons is also in the panel 300, the "OK" pushbutton 323 stores the plan to memory. The "cancel" pushbutton 325 ends the planning session without saving the information. "help" pushbutton 327 provides assistance to the network administrator. The "reset" pushbutton 329 sets the interface back to the original recommendations of the planning tool.

In FIG. 6, the network administrator has changed the assumptions of the planning tool. In the CPU and speed spinbutton 305, the administrator has entered a 486 class processor running at a speed of 66 megahertz. The number of clients has been changed to range of 500 to 1999 in the client spinbutton 307. In the setup for cell core 309, the one computer radio button 310 has been selected. The planning tool indicates to the network administrator that this configuration is marginal in terms of performance both by the data field 313 and the position of the slider 321 in the marginal area 319 of the performance bar 317. Thus, the network administrator is likely to select a different configuration for the software installation.

In FIG. 7, the network administrator has selected a CPU of Pentium (TM) class running at 75 megahertz using the CPU speed spinbutton 305 and the number of clients in the cell has been changed back to the 100 to 199 range using the client spinbutton 307. In the cell core area 209, the two-computer radio button 311 has been selected. Thus, an acceptable performance level is presented in data field 314. Although the performance is not as fast as the initial recommendations made by the planning tool, note the position of the slider 321 is lower in the acceptable area 320 of the performance bar 317, due to the hardware resources which the administrator wants to commit to the software program, it may be the best choice.

The reader will readily understand that other hardware resources such as network attachment media or network communications protocols may be used as part of the performance calculation. Although only a few values of the parameters were presented, wide ranges of the available RAM, DASD and the CPU speed may be used by the planning tool. Further, separate panels (not shown) in the planning panel might allow the user to individually stipulate the different hardware resources for each of the core machines. Graphical objects other than spinbuttons, and radio buttons could be chosen to select and present parameters in the panel.

Figure 8:
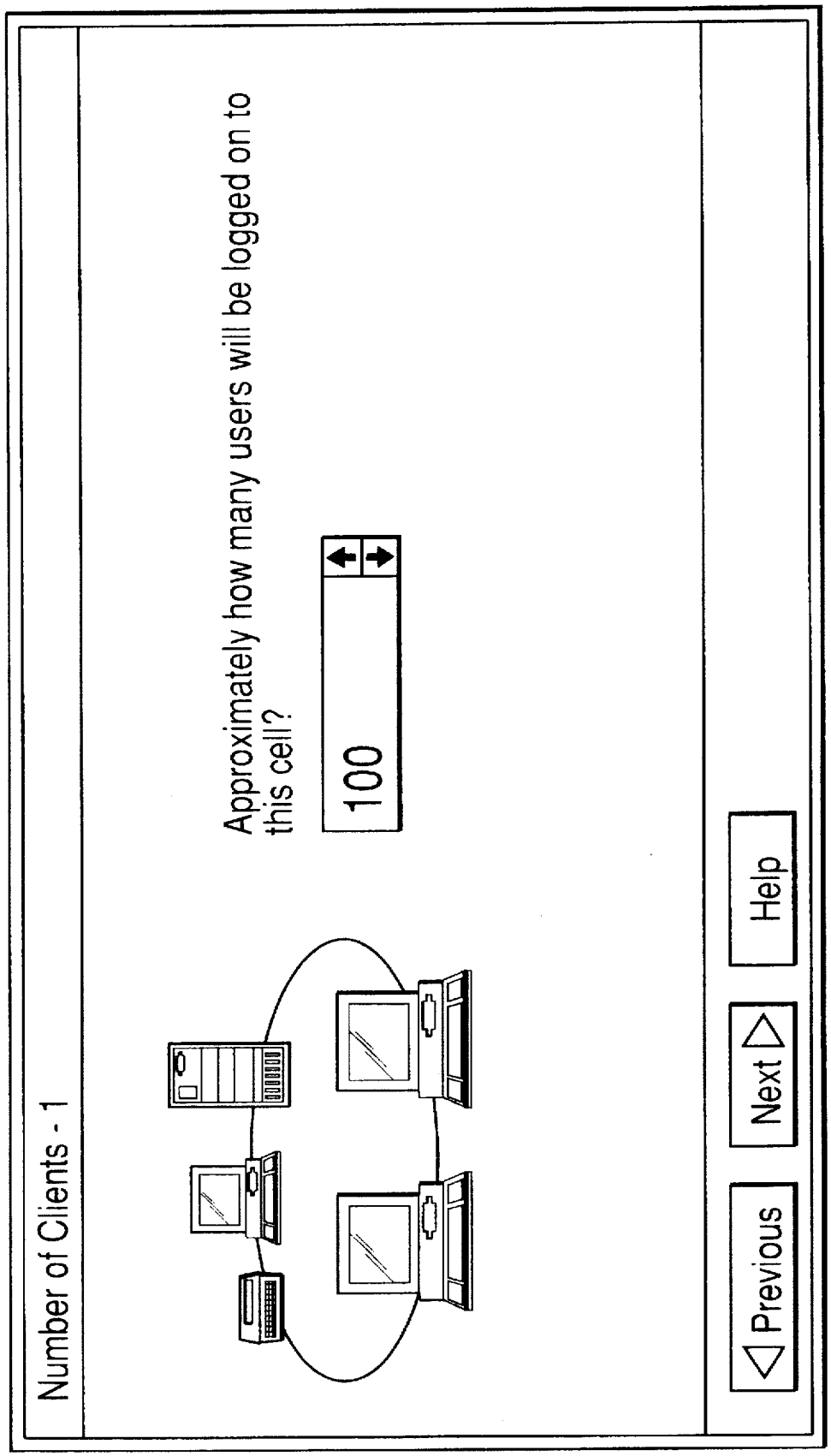
FIG. 8 is a graphical user interface during the installation process.

A series of panels could be used by the installation process to guide the network administrator in the software installation at the cell core. A panel (not shown) queries the administrator whether this is the first server in the cell on which the administrator installing the software product. A second panel such as shown in FIG. 8 would query the administrator as to the number of users in the cell.

Figure 9:
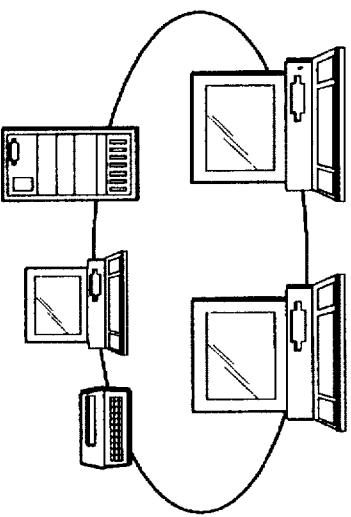
FIG. 9 is a graphical user interface installation process to verify the existence of additional workstations.

As alternative to the planning procedure described above, the installation tool could use the sensing and calculating functions of the present invention to sense the current hardware capacity and determine whether the current machine has enough capacity to install all of the software product. If not, a message would be presented in a panel to the network administrator, stating that the present machine does not have sufficient resources allowing the administrator the option of entering the planning process. However, as shown in FIG. 9, if two other workstations were available with the hardware capability presented in the figure, the software product could be installed. If the required workstations were not available, the installation process would end. The required workstation characteristics presented in the panel, shown in FIG. 9, would obviously vary according to the number of users selected in the cell. In this embodiment of the invention, the planning portion of the invention is not used by the administrator. The information sensed hardware is used by the expert system to arrive at the best installation plan. The installation process uses this information to construct the necessary files. The installation plan is presented to the administrator as instructions for installing the software product without an opportunity to modify the plan. For less sophisticated user, this embodiment may be the most preferred. The planning tool could be provided only in "advanced" installation option.

If the network administrator indicated that the required resources were available, further panels would prompt the administrator to create the installation assistant diskette, which would be used to install software product on the workstation and any other workstations which might be necessary. The installation diskette would contain instructions specific to each workstation so that the necessary components could be installed. In a physical installation process, the administrator would be prompted by panels, both at the local server and the second and third server for the installation of the software product.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for installing a distributed application in a distributed computing environment comprising the steps of:
    determining hardware resources of a local computer system in the distributed computing environment;

determining a number of users in a cell in the distributed computing environment;

determining whether the hardware resources of the local computer system can provide an adequate level of performance for the number of users in the cell if all of the distributed application is installed on the local computer system;

responsive to a determination that the hardware resources of the local computer system are inadequate, calculating an installation plan wherein different components of the distributed application are installed in different computer systems of a plurality of computer systems which will provide an adequate level of performance for the cell;

presenting the installation plan on a local system display; and installing the distributed application in the plurality of computer systems according to the installation plan.

2. The method as recited in claim 1 wherein the step of installing further comprises the step of installing components of the distributed application remotely from the local machine via an electronic installation process.

3. The method as recited in claim 1 wherein the level of performance and the installation plan are calculated by an expert system.

4. The method as recited in claim 1 wherein the hardware resources of the local computer system are determined by a sensing process at the local computer system.

5. A method for installing a network application in a computer network comprising the steps of:

collecting network data about a cell in the network including the hardware resources of individual computer systems in the cell;

presenting an installation plan on a system display specifying respective systems of a plurality of computer systems in which to install different respective components of the network application which will give an adequate level of performance for the cell based on the collected network data;

changing the installation plan according to user input; and installing the respective components of the network application in the respective systems of the plurality of computer systems according to the changed installation plan.

6. The method as recited in claim 5 wherein the collecting step is accomplished through user input to a user interface at the system display.

7. The method as recited in claim 5 wherein the collecting step is accomplished by a sensing process at a local computer system.

8. The method as recited in claim 7 wherein the network data further comprises software resident at the plurality of computer systems.

9. The method as recited in claim 5 wherein the presentation of the installation plan includes a predicted level of performance for the network application in the cell.

10. The method as recited in claim 9 wherein the user chances data on the processor speed of at least one system of the plurality of computer systems.

11. A system for installing a network application in a computer network comprising:

an expert system for calculating an installation plan which specifies respective systems of a plurality of computer systems in which to install different respective components of the network application to achieve an adequate level of performance for a plurality of users of the network application;

a sensing tool for gathering information about computer systems in the network to provide input to the expert system;

a user interface for presenting the installation plan and for accepting user changes to the installation plan changing the respective system wherein of least one of the respective components is to be installed; and an install tool for installing different respective components of the network application in the respective computer systems according to the installation plan.

12. The system as recited in claim 11 wherein the user interface comprises:

a plurality of user modifiable graphical objects for presenting and modifying hardware capability data of at least one computer system in the network;

a user modifiable graphical object for presenting and selecting a set of computer systems in which to install respective components of the distributed application; and a performance bar for presenting a calculated level of performance for the network application on the selected computer systems with the presented hardware capability.

13. The system as recited in claim 11 further comprising means for remotely installing components of the network application over the network from a local computer system.

14. The system as recited in claim 11 further comprising a movable installation diskette for installing the network application on the respective computer systems wherein a file on the installation diskette is used to keep track of a status of an installation process.

as the different respective components of the network application are installed on each respective computer system.

15. A computer program product in a computer readable medium for installing a network application in a computer network, comprising:

means for causing a local computer system to gather hardware data concerning at least one computer system in the network;

means for causing the local computer system to generate an installation plan to install different respective components of the network application on each of a plurality of computer systems in the network using the hardware data as input to the installation plan;

means for causing the local computer system to present the installation plan in a user interface for modification by a user to produce a modified installation plan; and means for causing the local computer system to locally install at least one component of the network application according to the modified installation plan wherein different components of the distributed application are to be installed on remote computer systems.

16. The product as recited in claim 15 further comprising means for causing the local computer system to gather software information on at least one computer system in the network.

17. The product as recited in claim 15 wherein the means for causing the local computer system to generate an installation plan comprises an expert system.

18. The product as recited in claim 15 which further comprises a movable installation diskette including a status file which is used to keep track of a status of installing the different components of the network application.

19. The product as recited in claim 15 which further comprises means for causing the local computer system to remotely install a component of the network application on a remote computer system according to the modified installation plan.

* * * * *